United States Patent

Saarenketo

[11] Patent Number: 5,556,537
[45] Date of Patent: Sep. 17, 1996

[54] EQUIPMENT FOR CLEANING WASTE WATER

[75] Inventor: Tapio Saarenketo, Rovaniemi, Finland

[73] Assignee: Vapo OY, Jyvaskyla, Finland

[21] Appl. No.: 985,577

[22] Filed: Dec. 3, 1992

[51] Int. Cl.[6] ........................................ C02F 3/08
[52] U.S. Cl. .................. 210/151; 210/202; 210/205; 210/220
[58] Field of Search ..................... 210/715, 199, 210/200–202, 205–208, 219,220, 150, 151

[56] References Cited

U.S. PATENT DOCUMENTS

| | | | |
|---|---|---|---|
| 122,346 | 1/1872 | Almy | 210/715 |
| 3,408,288 | 10/1968 | Messa | 210/715 |
| 3,481,868 | 12/1969 | Gilwood et al. | 210/715 |
| 3,728,253 | 4/1973 | Kaufman | 210/715 |
| 4,135,946 | 1/1979 | Casey et al. | 210/199 |

FOREIGN PATENT DOCUMENTS

| | | |
|---|---|---|
| 2571354 | 4/1986 | France. |
| 1601158 | 11/1970 | Germany. |
| WO88/10239 | 12/1988 | WIPO. |

*Primary Examiner*—Thomas S. Wyse
*Attorney, Agent, or Firm*—Jones & Askew

[57] ABSTRACT

A wastewater tank intended for use in a small sewage treatment plant. A spiral pipe is coiled around the exterior casing of the tank and is structurally secured to that casing, so that the pipe imparts structural stiffness to the tank. For example, the casing and pipe may be of a thermoplastic material and are thermoplastically welded together so that the pipe is structurally attached to the casing. Wastewater passes in turn through the multiple treatment spaces in the tank, to undergo pre-sedimentation, flocculation, and clarification.

12 Claims, 5 Drawing Sheets

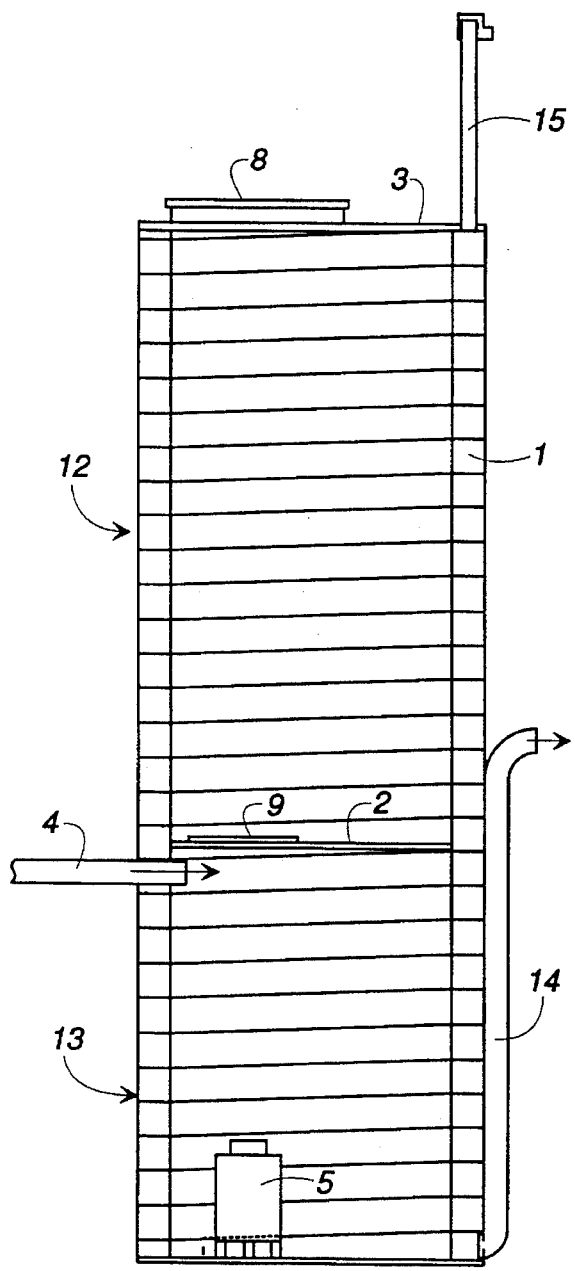
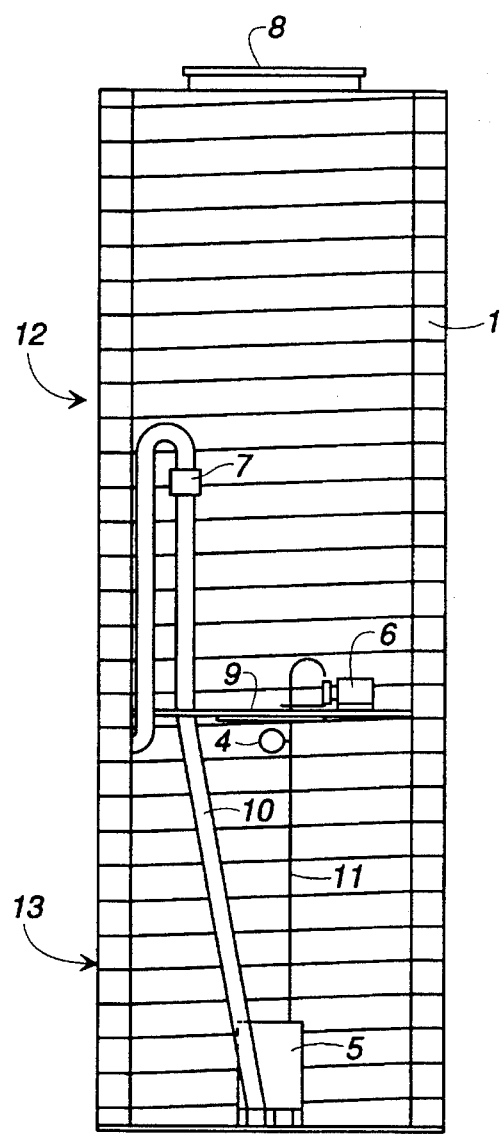
FIG. 1  FIG. 2

EQUIPMENT FOR CLEANING WASTE WATER

The object of the invention is a waste water tank or a small sewage treatment plant, which includes at least one sedimentation space limited by a wall for waste water, as well as the cleaning system used in these.

The most usual method of treating sewage or waste water in rural areas is to lead them to the ground through three separation tanks. In the tanks heavy particles or substances sink to the bottom and light ones rise to the surface. The water is led from one tank to the next by a plastic pipe, which takes liquid from between the layers. Traditionally, waste water tanks are made from concrete rings. Nowadays ready-made plastic tanks are also available. Small sewage treatment plants, which are a suitable sewage solution for example for terraced houses or a small group of houses, are an alternative to septic tanks. In this case maintenance and control are not left to a single resident.

In conventional chemical treatment, various tanks are used for pre-sedimentation, agitation, flash mixing, and sedimentation. In addition flash mixing and agitation devices with their motors are required. Waste water flows through the plant.

Treatment equipment is known from the French patent publication number 2,571,251 (LISZAK), in which the dosage of the flocculents, i.e. precipitants, takes place at the start of a long pipe after a pump. In some equipment vertical double-walled cylindrical tanks are used, between which walls it is suggested that a pipe coil be located.

The intention of the invention is to create an economical, easily installed model for a solution for the treatment of waste water, which also uses building materials carefully. It is also the intention of the invention to create an efficient and small cleaning unit. In order to achieve these aims, the characteristics of the method and equipment in accordance with the invention are as stated in the accompanying Patent Claims. By equipment what is meant here is either only a tank that carries out flocculation, or a cleaning unit equipped with several sedimentation spaces and auxilliary equipment.

What is used in this case is mainly a pipe, the internal diameter of which is quite large in relation to the wall thickness and which in cross-section is a square, circle, oval, or even a hexagon. A rather stiff thermoplastic is the most suitable pipe material. Suitable pipe is nowadays available under many trade names.

The assembly of a tank or treatment plant wall from pipe may, of course, take place in many ways, but the simplest is to bend the pipe spirally and at the same time to weld or glue it as an extension of an already prepared wall construction. Thus a pipe-shaped tank wall grows continuously and it can be then cut to suitable lengths and equipped with bottom and cover components as well as with other possible flanges or accessories.

A waste water tank made from spirally coiled pipe is light in construction, but it withstands earth pressure well. The air inside the pipe acts as a heat insulator or the pipe can act as a flocculation pipe. By means of a programmable welding machine it is easy to manufacture many sizes and, if required, also many shapes of tank wall. There are more advantages if chemical waste water treatment is added to a tank of this kind, when it is possible to speak of a small-scale treatment plant. In it the pipe, or at least part of it, can act as a reservoir for a treatment substance, which can easily be filled from outside.

A simple wall construction is also created by using a cylinder that limits the container, or other similar spiral pipe attached to the external surface of the wall. Advantageously the pipe and outer shell are made from a material that thermoplastically attaches itself to itself, for example PEHD polyethylene plastic.

The intention of chemical treatment is generally the flocculation of waste water, i.e. the alteration of dissolved substances into a flake-like form, in which they can be separated. Flocculation is considerably promoted by the fact that waste water is flash mixed in a pump and agitation takes place in a flocculation pipe. This can now be done by adding a treatment substance to the intake opening of the pump and by then pumping the waste water into a pipe, the turbulent flow which then arises promoting the formation of floccules. The chemical dosage is carried out in accordance with the output of the pump, when it is very precise.

A small treatment plant in accordance with the invention can easily also have a biological cleaning unit added to it, for example an endless biomat that encircles it partly in the air and partly in water. It is then advantageous to make the treatment plant stretched in horizontal section and to separate the bio- unit by, for example, a longitudinal wall, the secondary purpose of which is to support the structure. An additional wall or walls can further separate spaces for pre- and or post-sedimentation tanks and for pumping spaces, in which case what has been assembled is indeed a complete, compact, and efficient treatment plant solution. It is advantageous to lead the waste water to be precipitated by means of a pacification pipe to beneath the sludge blanket in the settlement tank, when the clarifier separated from the sludge has to travel through the previously formed deposit. Water oxygenized by a biomat also keeps the sludge blanket oxygen-rich, when the nutrients cannot re- dissolve.

The invention is described in the following examples with reference to the accompanying drawings, in which FIGS. 1 and 2 show a small treatment plant in vertical cross section.

Figure 3:
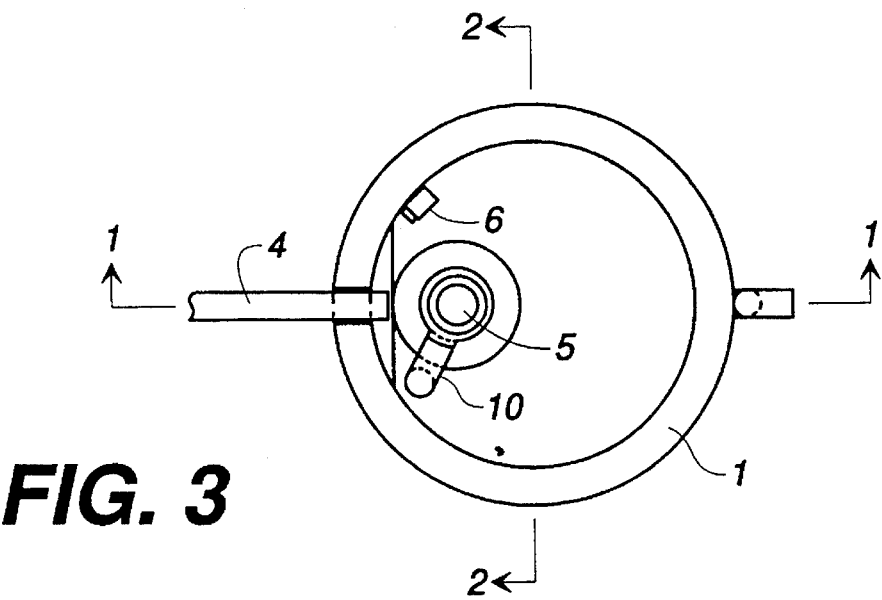
FIG. 3 shows the small treatment plant of FIG. 1 seen from above.

As can be seen from FIGS. 1 and 2, the vertical wall of the cleaning plant is formed by a spiral pipe 1. In addition, the construction consists of an intermediate flange 2, a cover 3, and of course a base plate. Flange 2 divides the cleaning plant into an upper maintenance space and a lower waste water tank. The flange 2 and cover 3 are equipped with maintenance hatches 8 and 9. The waste water inlet pipe 4 opens immediately beneath the intermediate flange 2. Its entry cuts pipe 1 and suitably divides it into a chemical substance reservoir 12 in the upper part and a lower part acting as a flocculation pipe 13. The waste water pump 5 is located on the base of the cleaning plant. It pumps waste water through hose 10 and non-return valve 7 to the upper part of the flocculation pipe 13. After circulating in the flocculation pipe 13 the waste water finally enters outlet pipe 14.

The feed and dosing pump 6 for the treatment substance is on top of flange 2. It is connected to the lower part of reservoir pipe 12, from which it feeds treatment chemicals through hose 11 to pump 5, in which the chemical is mixed with the waste water. The chemical reservoir is filled from pipe 15.

Phosphorous that is in a dissolved form in the tank or cleaning plant is precipitated by the pipe flocculation method, in which case at least part of pipe 1 acts as a flocculation pipe or pipes. Advantageously the lower section 13 of pipe 1 acts as a flocculation pipe, which is connected to the waste water pump 5, which is located in the space delimited by the aforementioned lower section 13, which acts as a waste water tank.

When applying chemical waste water treatment the upper section 12 of pipe 1 acts advantageously as a chemical treatment substance reservoir and the treatment substance feed pump 6 is located in the space delimited by this section 12.

Figure 5:
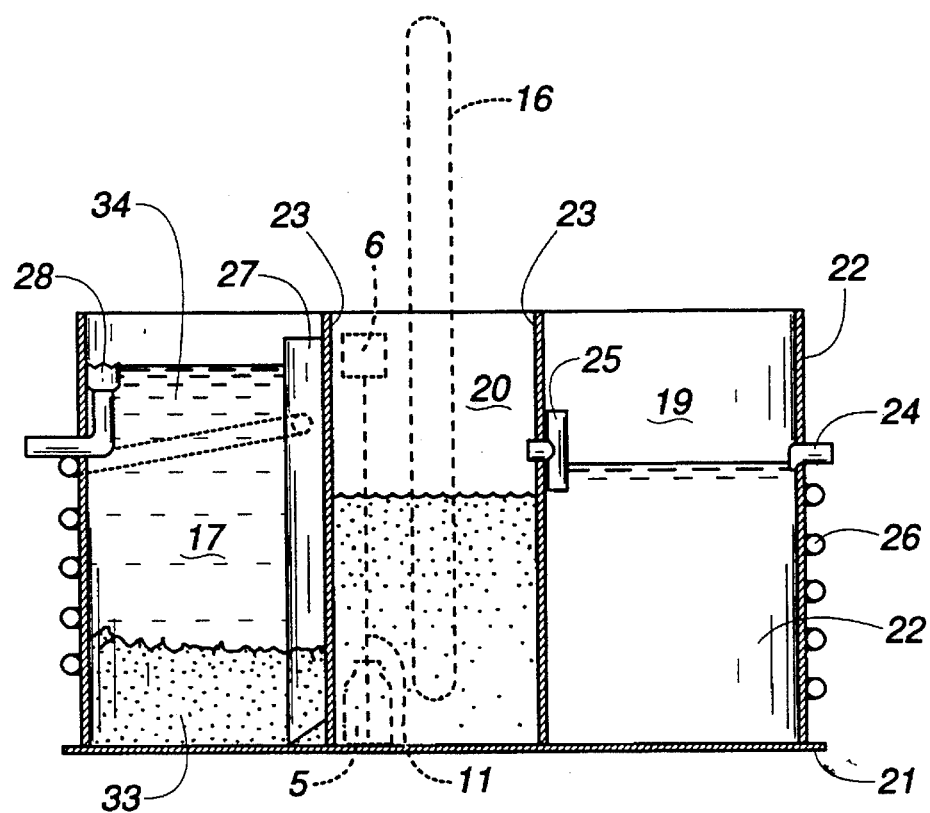
FIG. 5 shows a cross section of the unit in FIG. 4.
Figure 4:
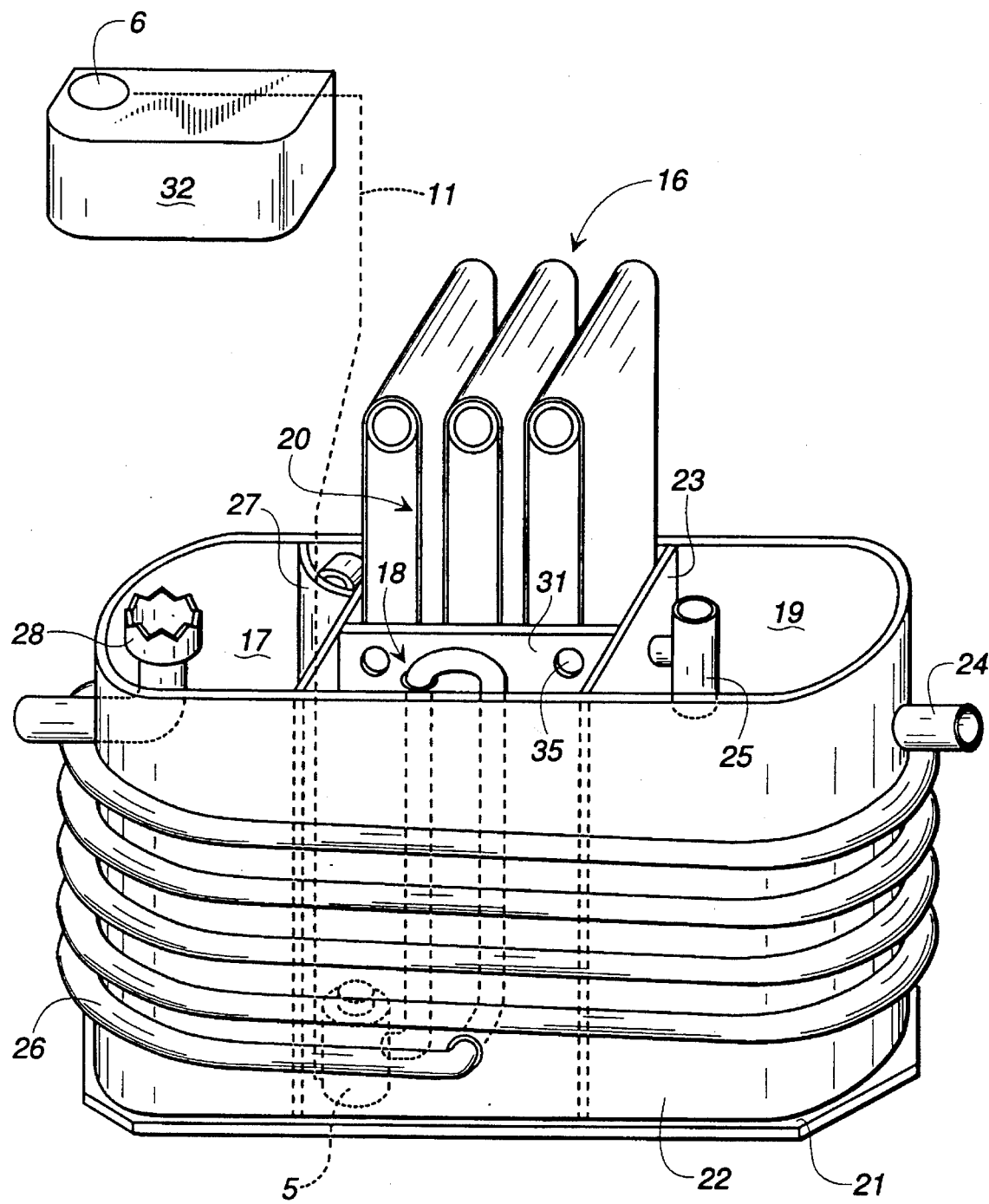
FIG. 4 shows a cleaning unit in an axonometric view.
Figure 5:
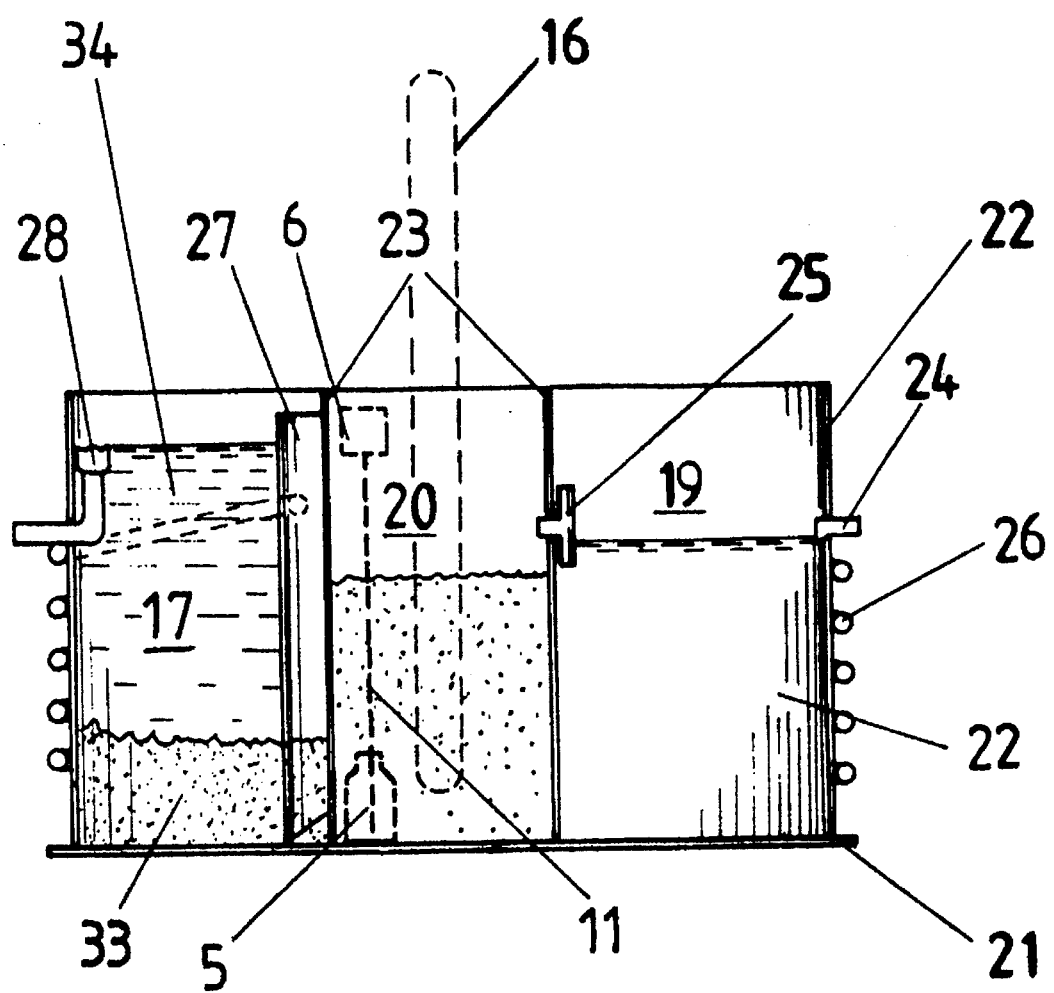

FIGS. 4 and 5 show a complete waste water cleaning unit, the various spaces in which are constructed by means of a flange 22, a base plate 21, two transverse walls 23 and a longitudinal wall 31. The construction stiffens pipe 26, which is spirally coiled around wall 22. The material of all of these is polyethylene plastic which can be formed thermopastically by means of heat treatment.

The unit consists of pre-sedimentation space 19, intermediate space 20, and sedimentation space 17, as well as pump space 18. The waste water is led to the pre-sedimentation space 19 through the inlet connection 24 and from this space on through connection 25 to intermediate space 20. Here the biological cleaning unit 16 is located, in which the requisite number of endless mats continually circulate partially sunk in the waste water. The small organisms formed in the mats purify the waste water in a known manner.

The waste water flows from intermediate space 20 through the holes 35 in the wall 31 to the pump space 18, on the base of which pump 5 is located, this pumping the waste water to pipe 26, which is coiled spirally around the wall. Chemical precipitant is dosed from reservoir 32 seen in FIG. 6 by means of pump 6 and is led by pipe 11 to the intake of pump 5. Reservoir 32 is located in a desired place. Flash mixing takes place in the impeller of pump 5 and agitation to form floccules in the flocculation pipe 26. Pipe 26 terminates in the stilling pipe 28 of the sedimentation space 15, which leds the precipitating waste water to beneath the previously collected sludge blanket 33 in the sedimentation space 17. The clarified water 34 separating from the waste water must travel through the sludge blanket 33, which improves its sedimentation. The clarified water flows through connection 28 to an area reserved for the purpose, for example to a soak-away in the ground. The sludge is removed from spaces 17, 19, and 20 at regular intervals.

A single pump is sufficient for a system in accordance with the invention, by means of it the waste water can also be pumped to the desired level. The sedimentation space can be utilized entirely, whereas with the previous flow systems only half of the space of the sedimentation tank could be utilized.

Figure 7:
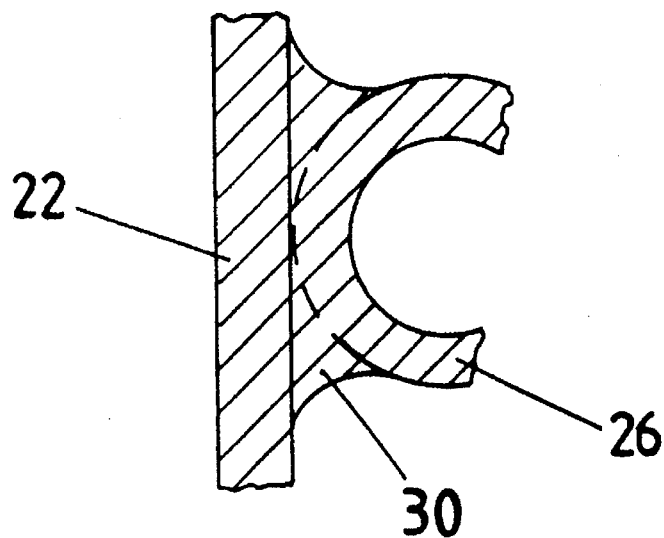
FIG. 7 shows a thermo-jointed construction.

FIG. 7 shows pipe 26 thermoplastically attached to casing 22. These and the web 30 of additional material are welded to form a completely homogeneous component. Here pipe 26 provides considerable additional stiffness to casing 22. One cleaner, the dimensions of the casing of which are length 5 m, width 2,14 m, and height 3 m, is constructed from 15 mm PEHD sheet. The diameter of the spiral flocculation pipe is 110 mm (NS110), length 50 m, and the material is the same PEHD plastic.

Figure 6:
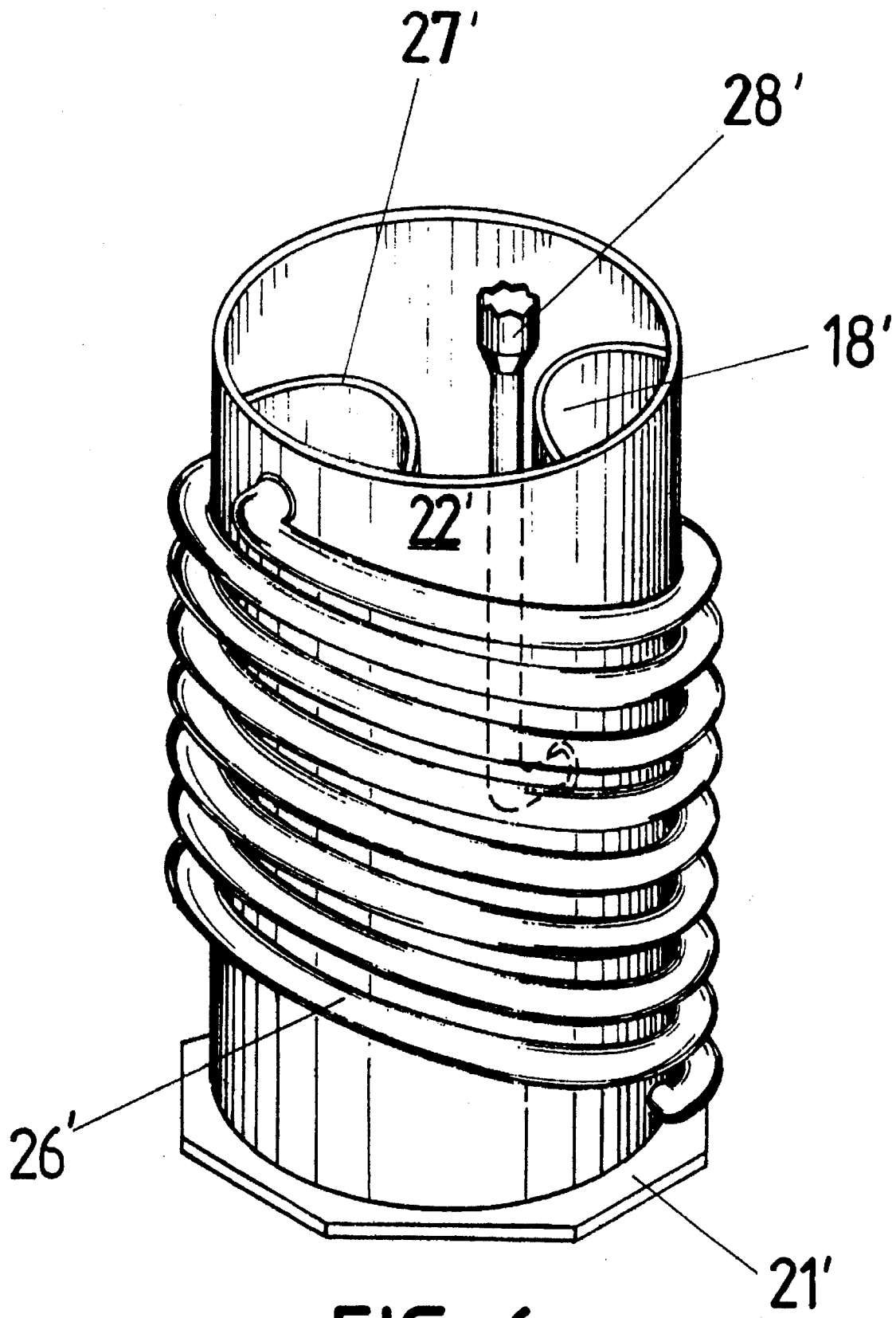
FIG. 6 shows a third cleaning unit.

FIG. 6 shows a system consisting of only a single septic tank without chemical dosing equipment The cylinder 22' the base 21, the pipe 26' the pump pit 18' and the pacification pipe 27' are thermo-welded to one another together with a web of additional material. The waste water is conducted to the pump pit 18' on the bottom of which the pump is located The waste water, which has been dosed with a chemical, is pumped to pipe 26', which leads to the stilling pipe 27' and it precipitates immediately in the tank. The clarified water is removed through pipe 28'.

By means of a cleaning unit of this kind old septic tanks can be converted into chemical treatment plants, because it can be raised as a package and lowered next to the tanks and connected for example between the second and third tanks of the three tank system mentioned at the beginning. In addition, it is of course suitable for use as a pumping and flocculation unit in new and renovated plants.

I claim:

1. A waste water tank, which includes walls delimiting at least one sedimentation space for waste water, wherein:

the wall of the sedimentation space of the tank define a casing; and further comprising spirally coiled pipe (1, 26) engaging an exterior surface of the casing and at least partly functioning as a flocculation pipe (13); and means structurally securing the pipe to the exterior surface of the casing, so that the pipe imparts structural stiffness to the tank.

2. A tank in accordance with claim 1, wherein:

an upper section (12) of the pipe comprises a reservoir for a chemical treatment substance; and further comprising a feed pump (6) for the treatment substance and located in the space delimited by the upper section (12).

3. A tank in accordance with claim 1, wherein a lower section (13) of the pipe (1) comprises a flocculation pipe and is connected to a waste water pump (5), which is located in a space functioning as a waste water tank and delimited by the lower section (13).

4. A tank in accordance with claim 1, wherein at least the casing (22) and pipe (26) are manufactured from a thermoplastic material and are thermoplastically welded together so that the pipe is structurally attached to the casing.

5. A tank in accordance with claim 1, wherein the pipe (26), the casing (22), and a web (30) interconnecting the casing and pipe are of the same material, and wherein the pipe (26) is welded to the casing (22) together with the web of additional material (30) and thus forms a homogeneous bond with the casing.

6. A tank in accordance with claim 4, wherein the pipe (26), the casing (22), and a web (30) interconnecting the casing and pipe are of the same thermoplastic material, and wherein the pipe (26) is welded to the casing (22) together with the web of additional material (30) and thus forms a homogeneous bond with the casing.

7. A tank in accordance with claim 1, wherein an upper section (12) of the pipe comprises a reservoir for a chemical treatment substance, and further comprising a feed pump (6) for the treatment substance and located in the space delimited by the upper section (12).

8. A tank in accordance with claim 1, wherein a lower section (13) of the pipe (1) comprises a flocculation pipe and is connected to a waste water pump (5), which is located in a space functioning as a waste water tank delimited by the lower section (13).

9. A waste water cleaning unit which includes a presedimentation space (19), a flocculation pipe (26), a sedimentation space (17), an intermediate space (20) between the pre-sedimentation space and the sedimentation space, and a pump (5), as well as chemical dosing devices (6) in order to achieve a mixing flow, wherein:

at least the pre-sedimentation space (19) and the sedimentation space (17) comprise a pipe-like casing (22) including a cylinder and a base plate (21) to form a tank divided by means of intermediate walls (23,31) into separate spaces (17, 18, 19, 20); and the flocculation pipe (26) is coiled spirally onto an outer surface of tile casing (22) and is structurally attached to tile outer surface in order to increase mechanical structural strength and stiffness of the casing.

10. A waste water cleaning unit in accordance with claim 9, wherein the flocculation pipe (26) is connected to an upper section of the sedimentation space, but is separated by a stilling pipe (27) from the sedimentation space, the stilling pipe being open above the water level and extending to the base of the tank, and the stilling space is connected to the sedimentation space (17) in order to lead the waste water to beneath a sludge blanket (33) that forms in the tank.

11. A waste water cleaning unit in accordance with claim 9, further comprising continually circulating mats (16) located in tile intermediate space (20) and operative to biologically clean waste water admitted to said space (20), and which are partly in the air and partly submerged in the waste water.

12. A cleaning unit in accordance with claim 9, further comprising a pump (5) operative to pump the waste water through a waste water pipe to the flocculation pipe and wherein a chemical treatment substance feed pipe (11) is connected to the waste water pipe before the pump (5).

\* \* \* \* \*